P. T. ARDUINO.
APPARATUS FOR PREPARING COFFEE INFUSION.
APPLICATION FILED APR. 16, 1919.

1,344,161.

Patented June 22, 1920.

Inventor:
Pier Teresio Arduino

P. T. ARDUINO.
APPARATUS FOR PREPARING COFFEE INFUSION.
APPLICATION FILED APR. 16, 1919.

1,344,161.

Patented June 22, 1920.
2 SHEETS—SHEET 2.

Inventor:
Pier Teresio Arduino
By Emil Bouvelythe
Attorney.

UNITED STATES PATENT OFFICE.

PIER TERESIO ARDUINO, OF TURIN, ITALY.

APPARATUS FOR PREPARING COFFEE INFUSION.

1,344,161.  Specification of Letters Patent.  Patented June 22, 1920.

Application filed April 16, 1919. Serial No. 290,418.

*To all whom it may concern:*

Be it known that I, PIER TERESIO ARDUINO, subject of the King of Italy, residing at Turin, Italy, have invented certain new and useful Improvements in Apparatus for Preparing Coffee Infusion, of which the following is a specification.

The present invention relates to apparatus for preparing infusions of coffee; and it resides in the provision of an improved apparatus, of the character stated, the component parts of which are constructed and arranged with a view to economy in the consumption of both the powdered coffee itself and of the fuel used in the preparation of the infusion.

The invention also aims to provide an apparatus which will be extremely simple as well as effective in its operation and which will serve to store the prepared coffee in comparatively large quantities; and it further comprehends the construction of the apparatus in parts or sections which are severally removable from one another, so that the apparatus may be readily taken to pieces and easily transported from point to point, thus rendering it particularly adapted for use by troops in the field.

An embodiment of the invention is illustrated in the accompanying drawings, in which.

Figure 1:
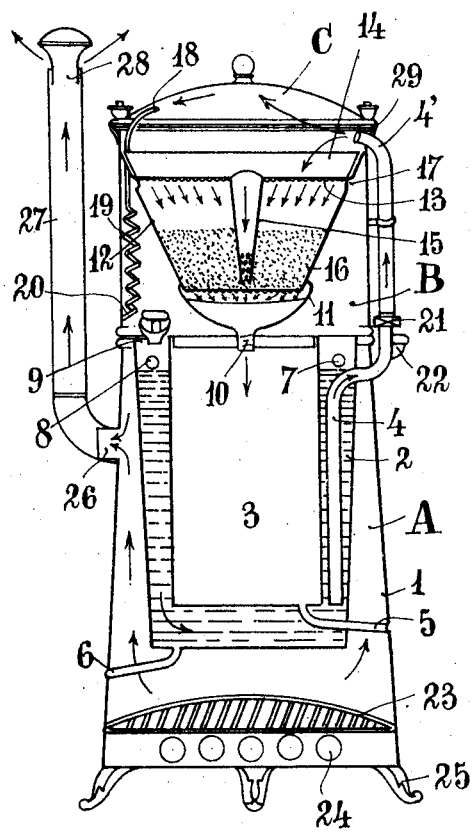
Figure 1 is a central vertical section of the complete apparatus.
Figure 2:
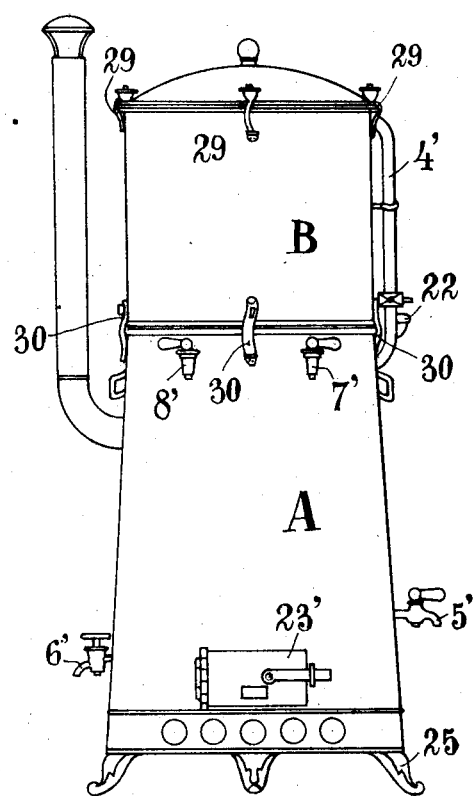
Figs. 2 and 3 are front and rear elevations, respectively.
Figure 3:
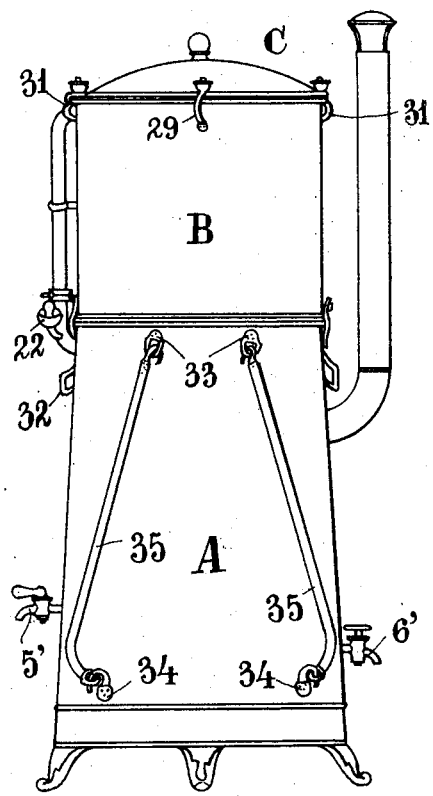
Figure 4:
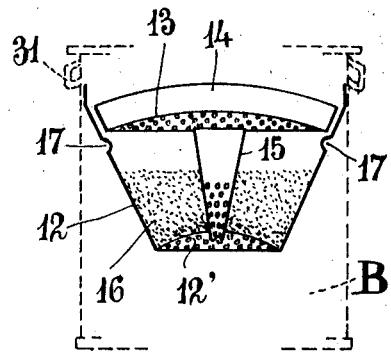
Fig. 4 is a diagrammatic vertical sectional view of the holder for the powdered coffee and the water spreader.

As shown in said drawings, the apparatus comprises upper and lower sections B and A, and a cover C for the latter section. The lower or main section A consists of a close-topped frusto-conical outer shell or casing 1 which is supported upon legs 25 and in which is mounted in some suitable manner an inverted frusto-conical water tank 2 containing, in turn, a cylindrical holder or receptacle 3 for the coffee infusion. The bottom of the water tank is spaced some distance above that of the casing 1, which latter is provided with a grate 23, below which there is formed in the casing a series of draft openings 24, the space between the grate and the tank bottom thus constituting a heating chamber or fire-box which is continued upwardly along the sides of the tank.

The water tank and coffee receptacle are provided at their bottoms with outlet or draw-off pipes 6 and 5, respectively, said pipes extending outwardly through the casing and having valves 6' and 5'; and between the walls of the said receptacle and tank there is arranged a pipe 4 for conducting the boiling water upwardly from the tank and discharging it upon the powdered coffee in the upper section, as subsequently explained. This pipe 4 has its lower end terminating short of the tank bottom so as to prevent the water from being completely exhausted from the tank, the upper end of the pipe curving outwardly through an opening in the upper portion of the casing 1, and having connected to it by means of a coupling 21 an upper pipe section 4' which extends close to the wall of the section B and curves inwardly through the casing wall.

Two short pipes 8 and 7, respectively fitted with valves 8' and 7', are provided at the upper portion of the tank, the pipe 8 acting as an overflow device to control the level of the water in the tank, while the pipe 7 serves to permit steam to be drawn off from the apparatus when desired, both pipes extending outwardly through openings in the casing. Finally, there are provided on the section A two water inlets 9 and 22, both of which open into the top of the tank and are normally closed by screw plugs, either or both of which may be removed when the tank is to be filled.

Figure 5:
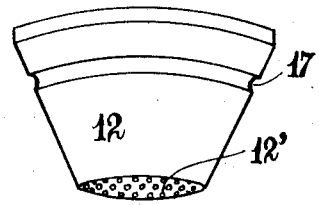
Figs. 5 and 6 are perspective views of the aforesaid holder and spreader, respectively.
Figure 6:
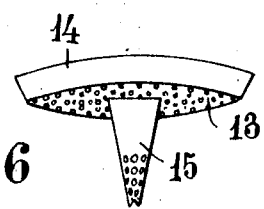

The upper section B, which is cylindrical in shape and has the same diameter as the upper end of the casing 1, rests upon said end and is secured in place by means of straps 30 or the like. This section contains an inverted frusto-conical holder 12 for the powdered coffee 16, which is suitably supported therein and which, in turn, has fitted in its upper end the spreader 13. The bottom 12' of the holder is perforated, as shown in Fig. 5; and the spreader, which has the form of a flat disk, is likewise perforated and is provided with an upstanding circumferential flange 14 (Fig. 6) which rests upon an inwardly-projecting annular rib 17 formed on the holder. The spreader is further provided with a central, depending spout 15, also perforated, which is rigidly connected thereto and which projects into the powdered coffee in the holder; and the latter, in turn, projects a slight distance into a funnel 11, the spout of which has a threaded fit in an opening formed in the center of the cover 10 of the coffee receptacle 3, (Fig. 1). The funnel may be detached from the cover 11 and utilized to facilitate filling of the tank, its spout being inserted in such instance into the enlarged end or mouth of either of the filling inlets 9 or 22 after the plug has been removed therefrom. The curved free end of the upper pipe section 4' overhangs the water spreader 13, so as to discharge the hot water from the tank thereupon.

The cover C preferably consists of a convex plate of suitable construction and material which rests upon the upper end of the section B and is fastened thereto by nut and bolt devices 29. The latter, as well as the straps 30, may be readily unfastened in order to permit the sections to be detached from one another for cleaning or transportation purposes, and may as readily be re-fastened after the sections have again been assembled. A small vent pipe 18 is arranged in the upper section B and extends vertically along the wall thereof, as shown in Fig. 1, its upper end projecting in close proximity to the under face of the cover C, while its lower portion 19 is formed as a coil, the free lower end of which opens at 20 through the wall of section B.

The chimney 27 of the apparatus is fitted at its lower end on a laterally-projecting neck 26 with which the upper portion of section A is provided, and carries at its upper end a cap 28. By arranging the parts in this way, it will be apparent that the upper portion of section A will be constantly occupied by the hot gases, which will be prevented from passing from that section into the upper section B, owing to the former section having its upper edge contacting with the wall of the tank so as to provide a tight joint at that point. Consequently, the heat of the gases will be constantly expended upon the tank, and the water therein will be kept hot.

To facilitate the transportation of the apparatus, the sections, A and B are provided, respectively, with handles 32 and 31, which enable them to be readily manipulated and carried; and the section A is also furnished with a pair of straps 35, or equivalent devices which permit that section, or the entire apparatus if desired, to be slung on the back, the opposite ends of the straps having ring and hook connections 33 and 34 with the casing 1 of said section.

The operation is substantially as follows, assuming that the apparatus is in disassembled condition:—The water tank 2 is first filled with the aid of the funnel 11, which is inserted into either inlet 9 or 22 after the corresponding plug has been removed, until the water commences to run out through the overflow pipe 8, whereupon the valve 8' in said pipe is closed and the valve 7' in the steam escape pipe 7 is opened. The funnel is then withdrawn and fitted in the opening in the cover 10 of the coffee receptacle and the plug reinserted in the inlet, after which the powdered coffee is deposited in the holder 12, and the spreader 13 then positioned therein. The upper section B, with the coffee holder in it and the cover plate fastened in place, is then mounted upon and attached to the casing 1 of the lower section, and the upper pipe section 4' finally connected to the lower pipe 4 with its curved discharge end overhanging the spreader. The fuel which has been previously placed on the grate 23 is next lighted and as the bottom of the tank is located in comparatively close proximity to the grate, the water will soon commence to boil, and will rise through the pipes 4 and 4' and be delivered to the spreader, whence it passes through the perforations therein and in the spout 15, and finally is discharged upon and into the powdered coffee, the infusion thus obtained flowing through the funnel into the receptacle 3 where it is kept in a hot condition by the water in the tank. When boiling first starts, a small amount of steam escapes through pipe 7, the valve 7' of which is then closed, so that thereafter the steam will collect in the top of the tank or boiler and will exert pressure downwardly upon the water, thus assisting its rise through the pipes 4, 4'. As the operation continues, the level of the water in the tank gradually sinks until it ultimately uncovers the lower end of pipe 4, whereupon steam will flow through said pipe and the upper pipe or section 4' and will be discharged upon the powder in the holder 12, which at that time is in a pasty condition, thereby driving off all moisture contained therein and leaving the paste fully dried. This has the effect of preventing the passage of the steam into the receptacle 3 and of forcing it to escape through the vent pipe 18, thus indicating the completion of the operation. The prepared coffee can then be drawn off as required through the pipe 5.

In case it is desired to prepare a greater quantity of coffee than can be obtained by a single charge of water in the tank, a correspondingly greater amount of coffee powder can be initially placed in the holder and the tank refilled at the completion of the first operation, as will be understood without necessitating any disconnection of the various parts, the refilling operation being effected, however, without the aid of the funnel which remains connected with the coffee holder and the receptacle cover 10. Furthermore, the apparatus may be kept ready for operation after the fire has been lighted, but without effecting any actual preparation of the infusion by merely leaving the steam escape valve 7' open, in which case the steam will escape freely through the pipe 7 and, hence, will exert no pressure upon the water in the tank, no passage of the water through the pipe sections 4, 4' then taking place. On the other hand, as soon as valve 7' is closed, steam will collect in the top of the boiler or tank and will force the water through said pipe sections and discharge upon the spreader.

What I claim as my invention and desire to secure by United States Letters Patent is:—

1. In a coffee-making apparatus, the combination of a body having separate upper and lower compartments; a water tank and a coffee receptacle in the lower compartment, the tank having a closed top; a holder for powdered coffee in the upper compartment communicating with the coffee receptacle, a pipe leading from the tank to the coffee holder and having its lower end terminating short of the bottom of the tank, so as to supply hot water to the holder until its said end is uncovered and thereafter to supply steam; and a separate pipe in the upper compartment for discharging therefrom the steam delivered by the first-named pipe, the last-named pipe having its outlet end opening through the wall of the upper compartment and being formed adjacent said end with a coiled portion for opposing a resistance to the flow of steam therethrough.

2. A coffee-making apparatus, comprising upper and lower detachably-connected casings; a boiler and a coffee receptacle in the lower casing, said receptacle having an apertured cover, a water inlet for the boiler opening through the wall of the lower casing; a holder for powdered coffee in the upper casing; a hot water supply pipe leading from the boiler to the holder; and a filling device for the boiler removably mounted in the aperture in said cover and normally fitting on the lower end of the holder to transmit the coffee infusion from the latter to said receptacle, but adapted to be detached from the holder and cover and fitted in said water inlet to fill the boiler.

3. A coffee-making apparatus, comprising upper and lower detachably-connected casings; a boiler and a coffee receptacle in the lower casing, said receptacle having an apertured cover; a water inlet for the boiler opening through the wall of the lower casing; a frusto-conical holder for powdered coffee mounted small end downward in the upper casing; a hot water supply pipe leading from the boiler to the holder; and a funnel having its spout removably fitting in the aperture in said cover and its mouth normally fitting over the small end of the holder to transmit the coffee infusion from the latter to said receptacle but adapted to be detached from the holder and cover and fitted in said water inlet to fill the boiler.

In testimony whereof I affix my signature.

PIER TERESIO ARDUINO.